July 30, 1929.  T. BROWN  1,722,786
TRACTOR PLOW
Filed Jan. 28, 1924   5 Sheets-Sheet 5
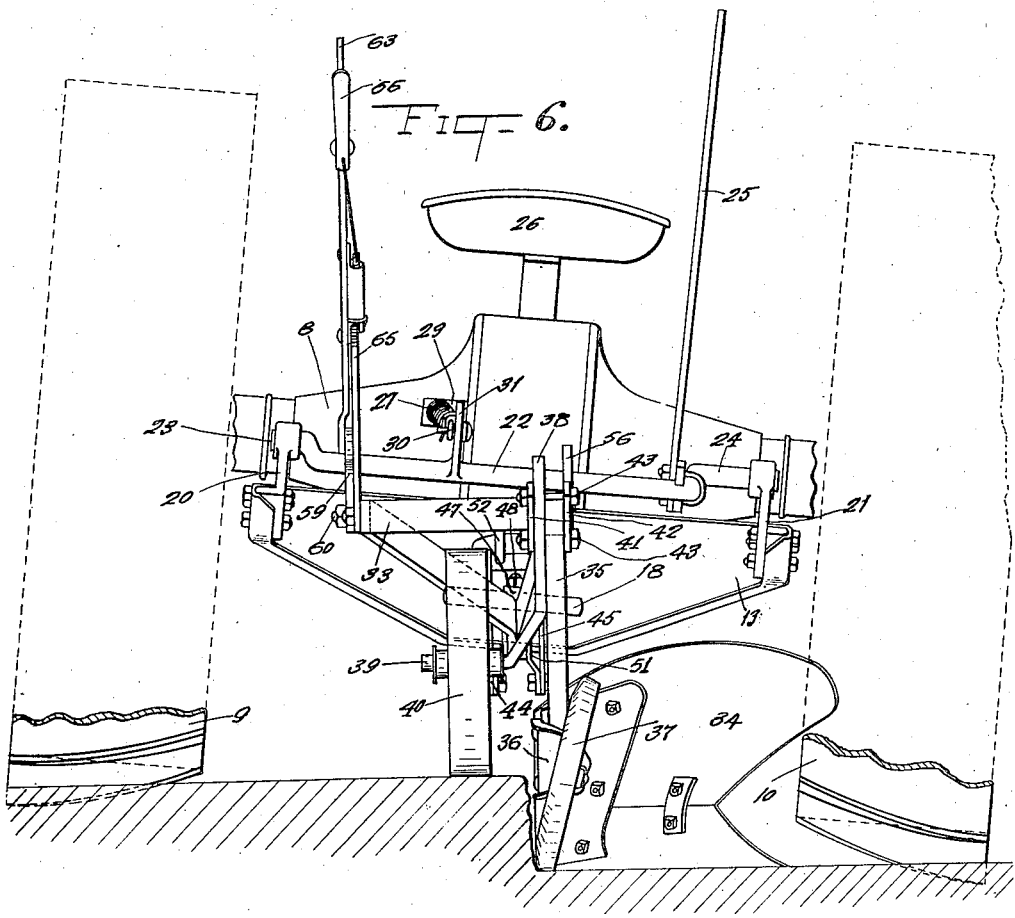

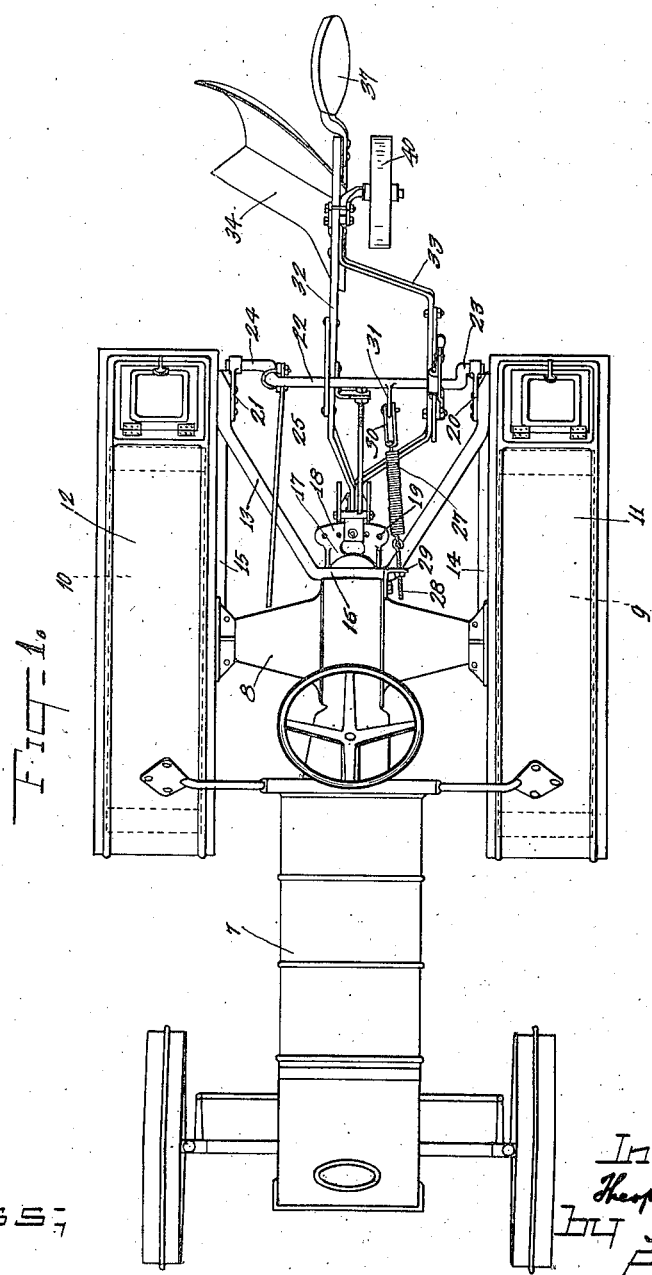

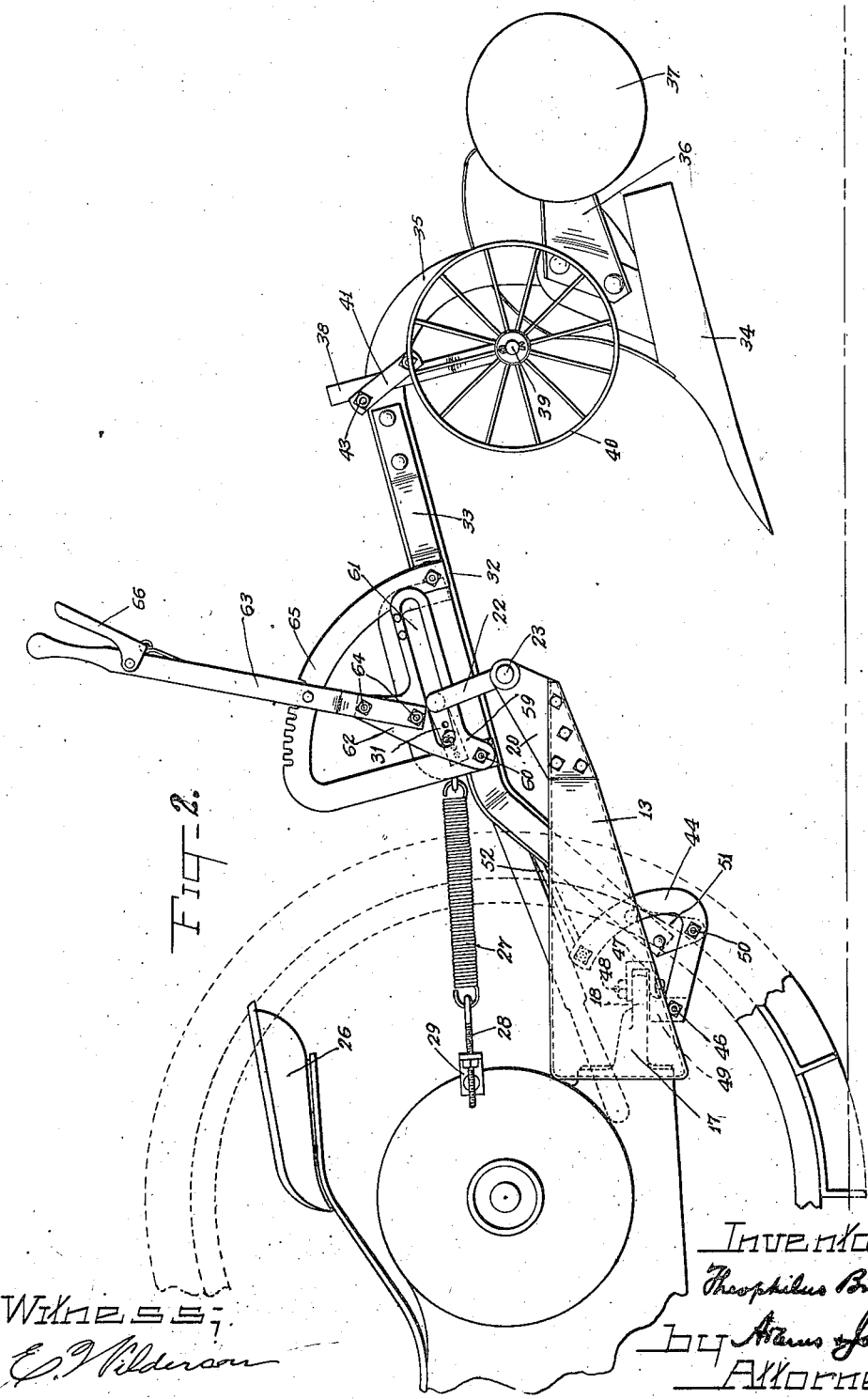

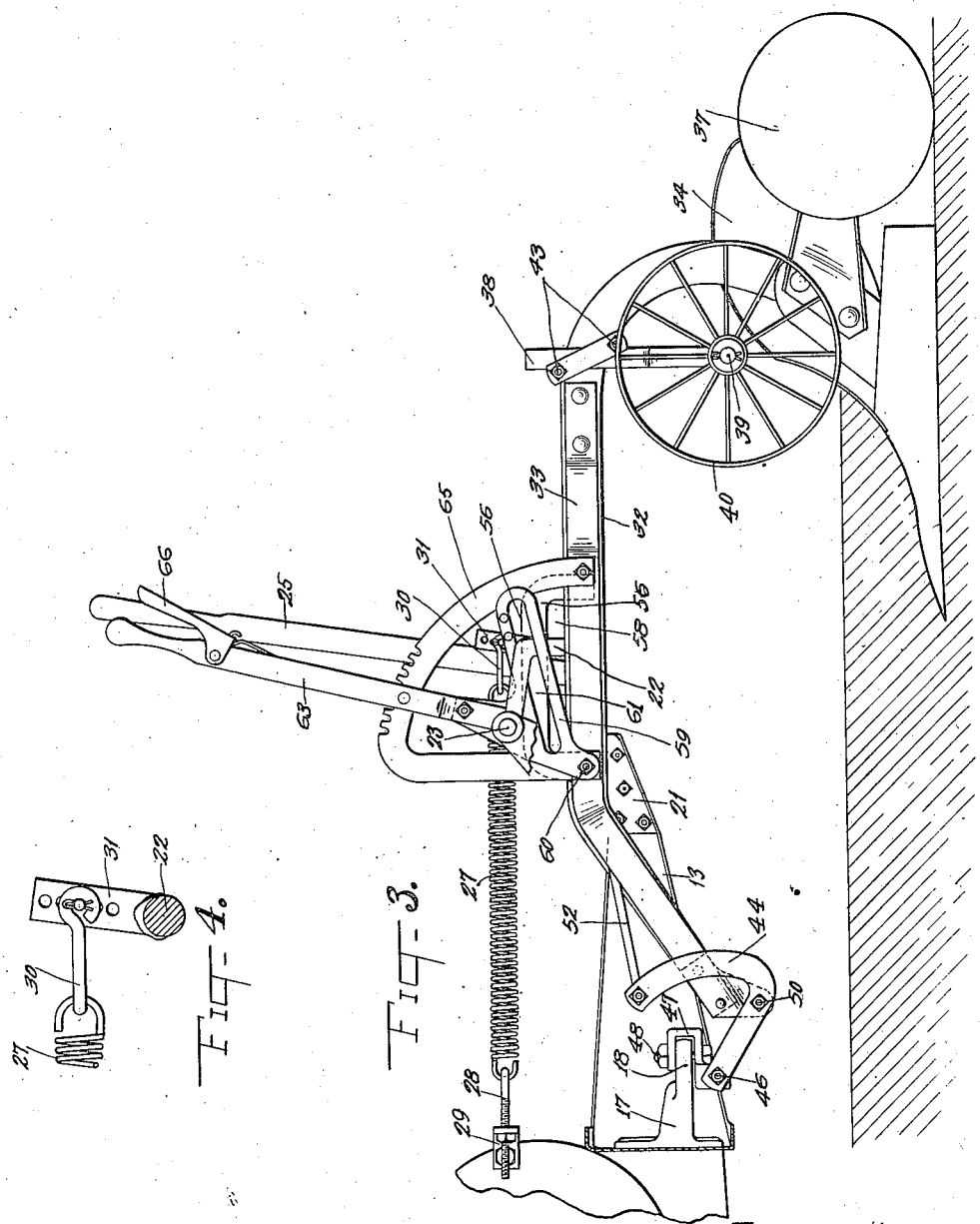

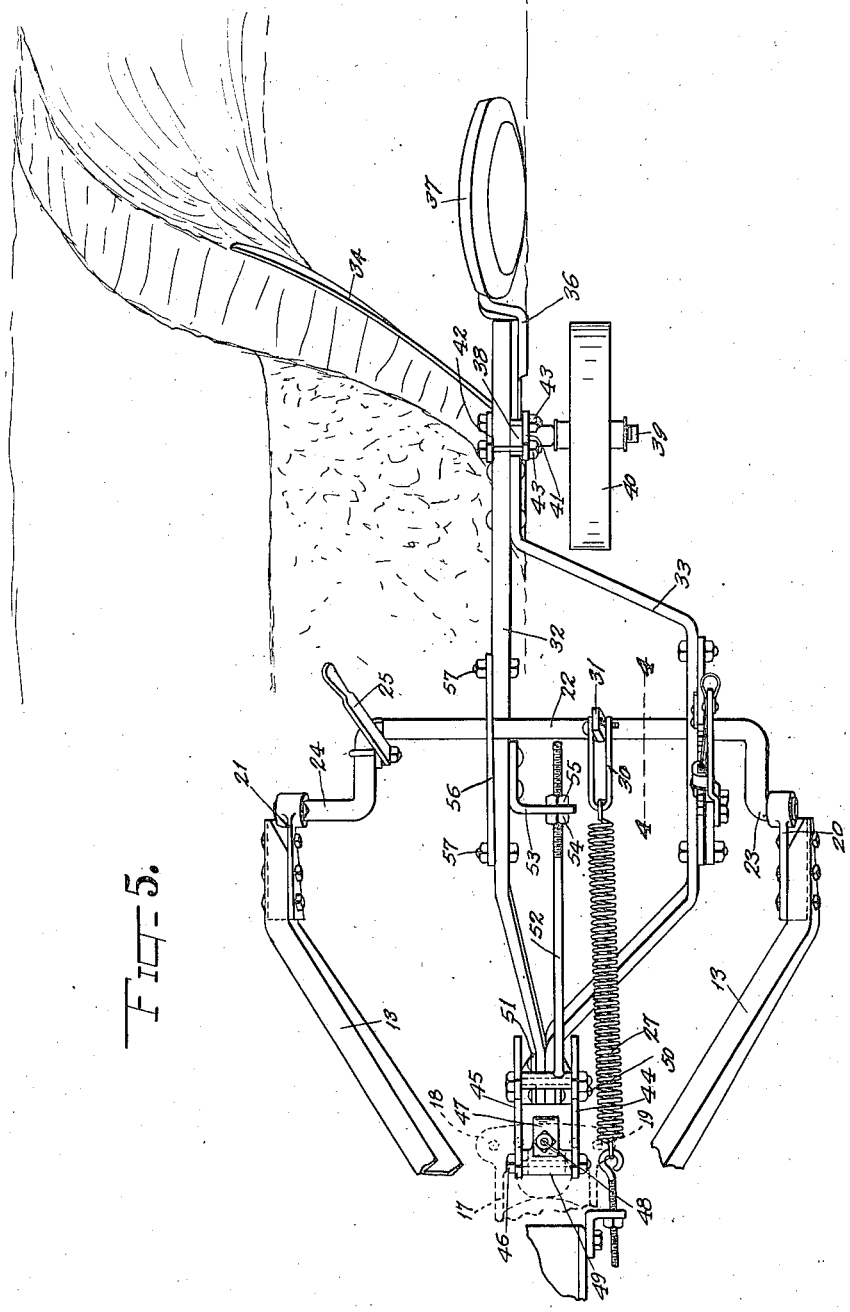

Patented July 30, 1929.

1,722,786

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

TRACTOR PLOW.

Application filed January 28, 1924. Serial No. 689,030.

My invention relates to tractor drawn plows, and has for its object to provide a close coupled plow having a low down hitch or draft connection with the tractor of such a character that the plow may swing laterally within reasonable limits, may be moved vertically into or out of operative position, and may be adjusted to plow at different depths; also to provide improved means for leveling the plow, and for raising or lowering it and supporting it while it is in its inoperative position. I accomplish these objects as illustrated in the drawings and as hereinafter described. What I regard as new is set forth in the claims.

In the accompanying drawings, which illustrate the preferred embodiment of my invention,—

Fig. 1 is a plan view of the combined plow and tractor with the parts as they appear when the plow is elevated for transportation;

Fig. 2 is a side elevation showing the plow and the rear portion only of the tractor;

Fig. 3 is a view similar to Fig. 2, with some parts broken away, showing the plow in its operative position;

Fig. 4 is a detail, being a longitudinal vertical section on line 4—4 of Fig. 5;

Fig. 5 is a partial plan view showing the plow in its operative position; and

Fig. 6 is a rear elevation.

Referring to the drawings.—7 indicates the tractor as a whole, and 8 the rear axle housing thereof which constitutes a part of the tractor frame. 9, 10 indicate the rear wheels of the tractor, shown in Fig. 6, which are protected by fenders 11, 12, best shown in Fig. 1. These fenders extend over the rear wheels and some distance rearward therefrom, and are supported at the rear by a strong V-shaped bracket 13, the arms of which diverge rearwardly and are braced by longitudinally extending braces 14, 15 secured at their forward ends to the tractor frame 8. The central portion of the bracket 13 is flattened, as shown at 16 in Fig. 1, and is fixedly secured in any suitable way to the central portion of the frame 8. A draw-bar 17, shown in full lines in Fig. 1 and in dotted lines in Fig. 2, is firmly secured to the rear face of the central portion 16 of the bracket 13, and extends rearwardly, where it is provided with a transversely extending hitch plate 18 having a number of holes 19 by which the hitch connection for the plow may be pivotally attached thereto and adjusted transversely with relation to the line of travel of the tractor.

Mounted in bearing plates 20, 21 secured to the rear end portions of the arms of the bracket 13 is a bail 22 which, as best shown in Figs. 1 and 5, extends transversely of the tractor and is free to swing on the spindles 23, 24 formed by the end portions of said bail to raise or lower the plow, as will be hereinafter described. A lever 25 is secured to said bail near one end thereof for manually rocking the same. This lever may be conveniently operated from the driver's seat 26 shown in Fig. 2. A spring 27, one end of which is connected by an adjusting screw 28 with a bracket 29 on the tractor frame, and the other end of which is connected by a link 30 with an arm 31 on the central or crank portion of the bail 22, serves to aid in lifting the plow.

The plow comprises a plow beam proper 32 having an extension at the landward side thereof in the form of a bar or bracket 33, the rear end portion of which is secured to the beam 32, as best shown in Figs. 2 and 5, while the forward end portion thereof is firmly secured to the forward end portion of the beam 32 which, as shown in Figs. 2 and 3, is inclined downward toward the hitch point of the plow. The beam 32 carries the usual plow bottom 34 secured to the standard portion 35 of the beam, to which also is secured a bracket 36 carrying a rolling landside 37, as best shown in Figs. 2 and 3. To the rear portion of the beam 32 is also secured an upright standard 38, at the lower end of which is a spindle 39 on which is mounted a depth limiting wheel 40 which runs on the land adjacent to the plow bottom 34, as best shown in Fig. 5. The standard 38 is secured to the beam 32 by clamp plates 41, 42 and bolts 43, best shown in Fig. 5. By adjusting the standard 38 vertically, the depth to which the plow may penetrate the ground may be controlled.

The forward end of the beam 32, together with that of the bracket 33, is connected with the draw bar 17 by means of a hitch member comprising two members 44, 45 in the form of bell-crank levers. These members, which are alike, are spaced a short distance apart, and their forward end portions are pivotally connected by a pivot bolt 46 with a stirrup 47 which fits upon the rear margin of the draw bar plate 18 and is pivotally connected thereto by a vertically-disposed pivot bolt 48 passing through one or another of the holes 19. The stirrup 47 is provided with a downwardly extending arm 49, indicated by dotted lines in Fig. 2, through which the pivot bolt 46 extends, as best shown in Fig. 3. By this construction the stirrup 47 is free to swing about a vertical axis, but is held against lateral tilting by reason of those portions thereof that extend over and under the drawbar plate 18, as clearly shown by dotted lines in Fig. 2. The forward end of the plow beam 32 is connected with the intermediate portions of the members 44, 45 by a horizontal pivot 50 which extends through said members and through a bracket 51 fixedly secured to the forward end of the plow beam, as shown in Figs. 2 and 3. The upper ends of the members 44, 45 are adjustably connected by a connecting rod 52 with a bracket 53 secured to the intermediate portion of the plow beam 32, said connecting rod being screw-threaded at its rear end and having nuts 54, 55 at opposite sides of the bracket 53, so that it may be longitudinally adjusted with respect to the beam 32. It will be evident that by so adjusting the rod 52 the effective hitch point may be vertically adjusted to vary the normal operating depth of the plow, and that by mounting the hitch members 44, 45 to swing vertically about the pivot 46 the plow beam may be swung vertically to carry the plow into or out of operative position. Also, the plow, together with the hitch members 44, 45 may be swung laterally about the vertical pivot 48. When swung either laterally or vertically, the effective hitch point is of course not affected.

The plow beam is operatively connected with the bail 22 by slotted hangers connected respectively with the beam proper 32 and with the bracket 33. The former consists of an inverted U-shaped bar 56, the downturned end portions of which are fixedly secured to the intermediate portion of the plow beam 32 by bolts 57, thereby forming a longitudinal slot 58, shown in Fig. 3, through which the bail 22 works. The slot 58 is wide enough so that the bail 22 may move freely in it longitudinally of the beam 32, but when said bail is rocked upwardly it operates through the hanger 56 to lift the beam 32. The hanger associated with the bracket 33 is in the form of a plate 59 pivoted at its forward end to said bracket by a pivot 60, and having a longitudinally extending slot 61, as shown in Figs. 2 and 3. Above said slot is an upwardly projecting arm 62, to which is rigidly connected an operating lever 63 by means of bolts 64 shown in Fig. 2. By means of this lever the hanger 59 may be swung vertically with respect to the bracket 33 about its pivot 60. The lever 63 may be locked to hold the hanger 59 in its different positions of adjustment by means of a sector 65 secured to the bracket 33, and adapted to be engaged by the usual latch carried by the lever 63 and operated by a latch lever 66. The landward end portion of the bail 22 extends through the slot 61 and is movable longitudinally thereof. Said bail may also be moved endwise through the slots 58 and 61 to permit the beam to swing laterally to follow the tractor in turning corners and rounding curves.

By the construction described, by swinging the hanger 59 in a vertical plane, its slot may be caused to assume a greater or less angular postion with relation to the slot in the other hanger, the purpose of providing which adjustment is to enable the plow to be maintained in a level position, notwithstanding the lateral tilting of the bail 22 incident to the fact that the wheels at one side of the tractor run in the furrow and those at the other side on the land. Obviously, as said bail is mounted between the ends of the bracket 13, which is rigidly attached to the tractor frame, when the tractor is tilted laterally, as is the case when plowing is being done, the bail is similarly tipped, as illustrated in Fig. 6. This would tip the plow laterally also if the two slots 58, 61 were in the same horizontal plane, but by swinging the hanger 59 upward about its pivot 60 sufficiently to compensate for the difference in level of the two end portions of the bail at the points where they pass through said slots, the plow frame comprising the beam 32 and the bracket 33 may be maintained in a horizontal plane so that the plow bottom runs level. By means of the adjusting lever 63 the plow may therefore be maintained level regardless of the plowing depth. When the plow is lifted or lowered by operating the lever 25, the bail rocks on its pivots and through the hangers supports the plow, but the leveling adjustment is not affected. Neither is it affected by the lateral swinging of the plow about the pivot 48.

When the plow is in its operating position, the crank portions of the bail 22 extend rearward from the spindles adjacent thereto respectively, in substantially horizontal planes, as shown in Fig. 3, and when the plow is lifted to its inoperative position for transportation the bail swings upward and forward to the position shown in Fig. 2, so that then the intermediate portion of the bail is above and forward of the axis about which it rocks, and the weight of the plow then tends to hold it elevated by reason of the past center position of the plow-supporting portion of the bail. When the plow is being lifted, the spring 27 aids in rocking the bail, and its effect may be regulated either by means of the nut on the rod 28 or by adjusting the link 30 with relation to the lever 31, said lever being preferably provided with a number of longitudinally spaced holes so that the link 30 may be connected therewith at different distances from the bail 22, as shown in Fig. 4. To lower the plow, the lever 25 is moved backward far enough to carry the crank portion of the bail over center with relation to its axis, whereupon the plow will descend by its own weight.

It will be noted that, regardless of the position of the hanger 59, the bail 22 always floats, or, in other words, is free to swing vertically, so that the normal operation of the plow is not interfered with, and as said bail is supported by bearings widely separated laterally, and the bearings between the bail and the plow frame, i. e. the beam 32 and bracket 33, are also widely separated, the plow is firmly held against accidental lateral tilting. When, however, it is desired to so tilt the plow, it may be easily accomplished by the lever 63 in the manner described. The pivots 46, 50, or one of them, may be made loose enough so as to permit such lateral tilting of the plow as may be necessary.

By the construction described, I provide for coupling the plow very closely to the tractor frame, so that the machine as a whole is very compact and is well adapted for use in small fenced fields where ordinarily difficulty is encountered in fence corners and other confined spaces. The plow may also be easily transported, as when lifted clear of the ground it is supported entirely by the tractor, and consequently there is no trailing part to interfere with the manipulation of the tractor. The plow may easily be backed, as the lateral swinging of the stirrup 47 is limited by its engagement with the draw-bar plate 18. With this construction, also, it is unnecessary to use a gauge wheel in front of the plow, and by this omission more clearance is obtained so that trash does not accumulate. The lifting lever being close to the driver's seat on the tractor makes it unnecessary to use long connections to enable the driver to move the plow vertically, which is also advantageous.

I wish it to be understood that by describing in detail the specific form in which I have embodied my invention, as illustrated in the accompanying drawings, I have not intended to limit my invention to the specific construction shown and described, except in so far as the claims may be directed particularly thereto, as in various respects my invention is generic in character, and the claims hereinafter made are to be construed accordingly.

What I claim as my invention and desire to secure by Letters Patent, is—

1. In a tractor plow, the combination with a tractor having a frame, rear wheels and a draft member between said wheels, of a plow beam connected with said draft member to swing vertically and laterally, a bail pivotally supported by the tractor frame rearward of said draft member in laterally separated bearings, the plow beam being connected with said bail to be lifted by rocking the same, and means for tilting the beam laterally with respect to said bail to level the plow.

2. In a tractor plow, the combination with a tractor comprising a frame, rear wheels and a draft member, of a plow beam, means connecting said beam with said draft member to permit the beam to swing vertically and laterally, and also to be tilted laterally relatively to the frame to level the plow, a transversely extending bail supported by the frame to swing vertically, and leveling means comprising connections between said bail and the beam operable to tilt the beam laterally with respect to said bail, and arranged to permit the beam to swing laterally while maintaining its level position.

3. In a tractor plow, the combination with a tractor having a frame, rear wheels and a draft member between said wheels, of a plow beam connected with said draft member to swing vertically and laterally, a bail pivotally supported by the tractor frame rearward of said draft member in laterally separated bearings, said beam being connected with said bail and being movable longitudinally thereof, and means connected with the beam and cooperating with said bail to rock the plow beam with respect to a longitudinal vertical plane, to level the plow.

4. In a tractor plow, the combination with a tractor having a frame, rear wheels and a draft member between said wheels, of a plow beam connected with said draft member to swing vertically and laterally, a bail pivotally supported by the tractor frame rearward of said draft member in laterally separated bearings, said beam being connected with said bail and being movable longitudinally thereof, means cooperating with said bail to rock the plow beam with respect to a longitudinal vertical plane, to level the plow, and means whereby said bail may be rocked to lift the plow.

5. In a tractor plow, the combination with a tractor having a frame, rear wheels and a draft member between said wheels, of a plow beam connected with said draft member to swing vertically and laterally, a bail pivotally supported by the tractor frame rearward of said draft member in laterally separated bearings, laterally spaced slotted hangers embracing said bail and connected with the plow beam, one of said hangers being vertically adjustable to tilt the beam laterally, and means whereby said bail may be rocked to lift the plow.

6. In a tractor plow, the combination of a tractor having a frame, rear wheels and a draft member between said wheels, of a plow beam connected with said draft member to swing vertically and laterally, a bail pivotally supported by the tractor frame rearward of said draft member in laterally separated bearings, laterally spaced slotted hangers embracing said bail and connected with the plow beam, one of said hangers being pivotally supported to swing vertically, a lever for swinging the latter hanger, and means whereby said bail may be rocked to lift the plow beam.

7. In a tractor plow, the combination with a tractor having a frame, rear wheels and a draft member between said wheels, of a plow beam drawn by said draft member and connected therewith to swing vertically and laterally, floating means carried by said frame back of said draft member and connected with the beam at laterally separated points for lifting the plow and supporting it in its inoperative position, and means operable to tilt the beam laterally relatively to said floating means to level the plow.

8. In a tractor plow, the combination with a tractor having a frame, rear wheels and a draft member between said wheels, of a plow beam connected with said draft member to swing vertically and laterally, floating means carried by said frame back of said draft member and connected with the beam at laterally separated points for lifting the plow and supporting it in its inoperative position, and means connected with the beam and cooperating with said floating means for leveling the plow.

9. In a tractor plow, the combination with a tractor having a frame, rear wheels and a draft member between said wheels, of a plow beam drawn by said draft member and connected therewith to swing vertically and laterally, a floating bail pivotally supported by the tractor frame to swing freely vertically in laterally separated bearings back of said draft member, the plow beam being connected with said bail and adapted to be lifted by rocking said bail, and means between the beam and said bail operable to tilt the beam laterally relatively to the frame to level the plow.

10. In a tractor plow, the combination with a tractor having a frame, rear wheels and a draft member between said wheels, of a plow beam drawn by said draft member and connected therewith to swing vertically and laterally, a floating bail pivotally supported by the tractor frame to swing freely vertically in laterally separated bearings back of said draft member, the plow beam being connected with said bail and adapted to be lifted by rocking said bail, and means operable to tilt the beam laterally relatively to the bail to level the plow.

11. In a tractor plow, the combination with a tractor having a frame, rear wheels and a draft member between said wheels, of a plow beam connected with said draft member to swing vertically and laterally, vertically swinging floating means carried by said frame back of said draft member, means operable to swing said floating means vertically, and devices connecting the plow beam at laterally separated points with said floating means for lifting said beam by vertical swinging of said floating means, and arranged to permit lateral swinging of said beam, one of said devices being operable to tilt the beam laterally relatively to said floating means to level the plow.

12. In a tractor plow, the combination with a tractor having a frame, rear wheels and a draft member between said wheels, of a plow beam connected with said draft member to swing vertically and laterally, a transversely disposed bail pivotally supported by said frame to swing vertically, the plow beam being connected with said bail at laterally separated points and being adapted to be lifted by rocking said bail, and to swing laterally thereon, and means operable to tilt the beam laterally with respect to said bail to level the plow.

13. In a tractor plow, the combination with a tractor having a frame, rear wheels and a draft member between said wheels, of a plow beam connected with said draft member to swing vertically and laterally, a transversely disposed bail pivotally supported by said frame to swing vertically, the plow beam being connected with said bail at laterally separated points and being adapted to be lifted by rocking said bail and to swing laterally thereon, and means operable to tilt the beam with respect to the bail to level the plow.

14. In a tractor plow, the combination with a tractor having a frame, rear wheels and a draft member between said wheels, of a plow beam connected with said draft member to swing vertically and laterally, means operable to vertically adjust the forward end portion of the beam to vary the depth of plowing, a ground-engaging depth-limiting device carried by the rear portion of the beam, lifting means for the beam pivotally connected with the tractor frame rearward of said draft member to swing vertically, and connections between said lifting means and the beam arranged to permit the beam to be tilted laterally relatively to said lifting means to level the plow and to swing laterally relatively to said lifting means while maintaining its level position.

15. In a tractor plow, the combination with a tractor having a frame, rear wheels and a draft member between said wheels, of a plow beam connected with said draft member to swing vertically and laterally, a bail mounted on the tractor frame to swing vertically and operatively connected with the beam back of said draft member for lifting the plow, and means connected with the beam and cooperating with said bail to level the plow.

16. In a tractor plow, the combination with a tractor having a frame, rear wheels and a draft member between said wheels, of a plow beam connected with said draft member to swing vertically and laterally, a transversely extending bail mounted on the tractor frame to swing vertically and devices connecting said bail with said beam back of its connection with said draft member, one of said devices being arranged to hold the plow against lateral tilting and being adjustable relatively to said bail to level the plow.

17. In a tractor plow, the combination with a tractor having a frame, rear wheels and a draft member between said wheels, said draft member having a transversely disposed rearwardly projecting plate, of a plow beam, a stirrup embracing the rear margin of said plate and pivotally connected therewith to swing in a substantially horizontal plane, the plow beam being pivotally connected with said stirrup to swing vertically, manually operated means mounted on the tractor frame back of said draft member and operable to lift the beam, and means connecting said lifting means with the intermediate portion of the beam and arranged to permit lateral swinging thereof, the latter means being adjustable with respect to said lifting means to level the plow.

18. In a tractor plow, the combination with a tractor having a frame, rear wheels and a draft member between said wheels, of a plow beam, a hitch member in the form of bell-crank levers spaced apart and pivotally connected at one end with said draft member to swing laterally and vertically, the forward end portion of said beam being pivotally connected intermediately with said levers, means adjustably connecting the other end portions of said bell-crank levers with the beam to vertically adjust the hitch point of the beam, means mounted on the tractor frame and connected with the beam for lifting the plow, and means for leveling the plow through said lifting means.

19. In a tractor plow, the combination with a tractor having a frame, rear wheels and a draft member between said wheels, of a plow beam, a hitch member in the form of bell-crank levers spaced apart and pivotally connected at one end with said draft member to swing laterally and vertically, the forward end portion of said beam being pivotally connected intermediately with said levers, means adjustably connecting the other end portions of said bell-crank levers with the beam to vertically adjust the hitch point of the beam, vertically swinging floating means mounted on the tractor frame and connected with the beam, means operable to swing said floating means vertically for lifting the plow, a ground-engaging depth-regulating member carried by the beam, and means for leveling the plow independently of said ground-engaging depth-regulating member.

20. In a plow, the combination with a frame, supporting wheels therefor, and a draft member connected with said frame, of a plow beam connected with said draft member to swing vertically and laterally, vertically swinging lifting means for the beam mounted on the frame rearward of said draft member and having connection with the beam, and means co-acting with said lifting means for adjusting the connection thereof with said beam to tilt the beam laterally relatively to said lifting means to level the plow.

21. In a plow, the combination with a frame, supporting wheels therefor, and a draft member connected with said frame, of a plow beam connected with said draft member to swing vertically and laterally, vertically swinging lifting means for the beam mounted on the frame rearward of said draft member, means connecting the beam with said lifting means and arranged to permit the beam to swing laterally while maintaining its level position, and adjusting means operable through said connecting means to tilt the beam laterally relatively to said lifting means to level the plow.

22. In a plow, the combination with a frame, supporting wheels therefor, and a draft member connected with said frame, of a plow beam connected with said draft member to swing vertically and laterally, lifting means for the plow beam comprising a vertically swinging bail mounted on the frame, means connecting the beam with the bail so that it may swing laterally thereon, and means between the beam and the bail operable to tilt the beam laterally relatively to the frame to level the plow.

23. In a plow, the combination with a frame, supporting wheels therefor, and a draft member connected with said frame, of a plow beam connected with said draft member to swing vertically and laterally, lifting means for the plow beam comprising a vertically swinging bail mounted on the frame, and means connecting the beam with the bail so that it may swing laterally thereon, and operable to tilt the beam laterally with respect to the bail to level the plow.

24. In a tractor plow, the combination with a tractor comprising a frame, rear wheels and a draft member, of a plow beam carrying a plow, means connecting the front portion of said beam with said draft member, a vertically swinging bail mounted on the frame, a lever mounted on the frame and operable to swing said bail vertically, means connecting the plow beam with the bail whereby the beam may be raised or lowered by operating said lever and may swing laterally along said bail, a lifting spring connected with said bail and with the tractor frame for counterbalancing the lifting weight of the plow beam and plow, and a ground engaging depth regulating member connected with the rear portion of the beam.

25. In a tractor plow, the combination with a tractor comprising a frame, rear wheels and a draft member, of a plow beam connected with said draft member to swing vertically and laterally, a vertically swinging bail having pivot portions mounted on said tractor frame, said plow beam having connection with said bail permitting endwise shifting movement between said beam and bail whereby the draft of said beam is carried by said draft member, a lever connected with said bail and operable to swing the latter vertically about said pivot portions whereby the beam may be raised or lowered by operating said lever, said bail having free vertically swinging movement in the operation of the plow to permit the latter to rise and fall relatively to the tractor, and means cooperating with said bail for leveling the plow relativtly to the tractor frame.

26. In a tractor plow, the combination with a tractor comprising a frame, rear wheels and a draft member, of a plow beam connected with said draft member to swing vertically and laterally, a vertically swinging bail having a pivot portion mounted on the tractor frame and an offset portion normally disposed to one side of the vertical axial plane of said pivot portion when the plow beam is in plowing position, means connecting the plow beam with the offset portion of said bail, and a lever connected with said bail and operative to swing the offset portion thereof upwardly and over on to the other side of the vertical axial plane of said pivot portion whereby to raise said plow beam and to lock said bail over center with the plow beam raised.

THEOPHILUS BROWN.